(12) United States Patent
Huang

(10) Patent No.: US 11,939,786 B1
(45) Date of Patent: Mar. 26, 2024

(54) COMBINABLE TENT

(71) Applicant: William Huang, Jiangxi (CN)

(72) Inventor: William Huang, Jiangxi (CN)

( * ) Notice: Subject to any disclaimer, the term of this patent is extended or adjusted under 35 U.S.C. 154(b) by 0 days.

(21) Appl. No.: 18/453,253

(22) Filed: Aug. 21, 2023

(51) Int. Cl.
*E04H 15/18* (2006.01)
*E04H 15/34* (2006.01)
*E04H 15/54* (2006.01)
*A01K 1/035* (2006.01)

(52) U.S. Cl.
CPC ............ *E04H 15/18* (2013.01); *E04H 15/34* (2013.01); *E04H 15/54* (2013.01); *A01K 1/035* (2013.01)

(58) Field of Classification Search
CPC ....... E04H 15/18; E04H 15/405; A44B 19/38; Y10T 24/2593
See application file for complete search history.

(56) References Cited

U.S. PATENT DOCUMENTS

| | | | | |
|---|---|---|---|---|
| 3,965,915 A * | 6/1976 | Kirkham | ................. | E04H 15/18 135/117 |
| 4,238,872 A * | 12/1980 | Akashi | ................... | A44B 19/62 156/66 |
| 4,942,648 A * | 7/1990 | Yoshida | ................. | A44B 19/38 24/388 |
| 5,159,948 A * | 11/1992 | Moreau | ................... | E04H 15/18 135/125 |
| 5,394,897 A * | 3/1995 | Ritchey | ................... | E04H 15/18 52/79.8 |
| 5,618,246 A * | 4/1997 | Zheng | ...................... | A63B 9/00 D21/826 |
| 5,620,396 A * | 4/1997 | Westphal | ................. | A63B 9/00 482/148 |
| 5,685,076 A | 11/1997 | Curley et al. | | |
| 6,565,405 B2 * | 5/2003 | Hsu | ....................... | A63H 33/008 446/478 |
| 7,073,523 B2 * | 7/2006 | Zheng | .................... | E04H 15/40 135/96 |
| 7,500,291 B2 * | 3/2009 | Matsumoto | ............ | A44B 19/38 24/434 |
| 7,882,602 B2 * | 2/2011 | Himi | ...................... | A44B 19/38 24/433 |
| 9,220,324 B1 * | 12/2015 | Nunn | ..................... | A44B 19/403 |
| 9,565,905 B2 * | 2/2017 | Huang | .................. | A44B 19/36 |
| 9,770,075 B2 * | 9/2017 | Sato | ...................... | A44B 19/285 |
| 11,377,868 B2 * | 7/2022 | Johnson | .................. | E04H 15/52 |
| 2002/0029795 A1 * | 3/2002 | Zheng | ..................... | A63B 9/00 135/125 |
| 2002/0083653 A1 * | 7/2002 | Hilbert | .................... | E04H 15/20 52/2.17 |
| 2003/0116182 A1 * | 6/2003 | Ueda | ....................... | E04H 15/20 135/124 |

(Continued)

*Primary Examiner* — Noah Chandler Hawk

(57) ABSTRACT

The present disclosure provides a combinable tent, including a plurality of tent modules and channel modules connected to the tent modules. Each of the tent modules has a spatial structure formed by multiple surfaces in a surrounding mode, and at least one opening configured to be connected to a corresponding one of the channel modules is arranged in at least one of the surfaces; and each of the channel modules includes a channel and zipper assemblies arranged at two ends of the channel, where the zipper assemblies are configured to implement communication between the channel modules and communication between the channel modules and the tent modules.

10 Claims, 3 Drawing Sheets

(56) References Cited

U.S. PATENT DOCUMENTS

| | | | | |
|---|---|---|---|---|
| 2004/0238021 | A1* | 12/2004 | Holub | E04H 15/30 |
| | | | | 135/97 |
| 2005/0189009 | A1* | 9/2005 | Walter | E04H 15/32 |
| | | | | 135/97 |
| 2017/0234029 | A1* | 8/2017 | Walter | E04H 15/30 |
| | | | | 135/147 |
| 2020/0128788 | A1 | 4/2020 | Zheng | |
| 2022/0389735 | A1* | 12/2022 | Liu | E04H 15/64 |
| 2023/0085227 | A1 | 3/2023 | Xu | |

* cited by examiner

COMBINABLE TENT

TECHNICAL FIELD

The present disclosure relates to a modular combinable tent.

BACKGROUND

Tents are common products; children or pets can rest or play in a tent. Ordinary tents have relatively limited spaces and simple internal structures. Children or pets require larger activity spaces and more variable spatial structures for entertainment. However, these requirements cannot be met by ordinary tents.

In the prior art, there is a combinable tent, but it has a relatively single combination mode, especially for channels between tents. With the structure and connection mode of channels, the channels cannot be interconnected, thus restricting the distance between tents. Moreover, the type of combination, especially the creative ability of children in combination is restricted.

SUMMARY

An objective of the present disclosure is to provide a combinable tent, to overcome the above deficiencies in the prior art.

To achieve the above objective, the present disclosure provides the following technical solution:

A combinable tent, comprising a plurality of tent modules and at least a channel module connected to the tent modules, wherein each of the tent modules has a spatial structure formed by a plurality of surfaces enclosed together, and at least one opening configured to be connected one channel module is arranged in at least one of the surfaces; and each of the channel modules comprises a channel and zipper assemblies arranged at two ends of the channel, wherein the zipper assemblies are configured to that one channel module is connected to another channel module via the zipper assembly and the channel module is connected to the tent module via the zipper assembly.

Compared with the prior art, the present application adopts a modular design, allowing children or pet owners to creatively build and obtain different spatial structures through combination according to their preferences. With the tent modules, different structure spaces can be designed according to different requirements, and can be used to accommodate items of different sizes, to meet different space requirements. The present application has the greatest advantage of implementing compatible interconnection and intercommunication between the channel modules and between the channel modules and the tent modules by the zipper assemblies arranged at the ports of the channel modules. Moreover, the channel modules can be formed into a channel corridor with a required length by the zipper assemblies, such that more spatial structures can be formed through combination by using the combinable tent according to the present application.

BRIEF DESCRIPTION OF THE DRAWINGS

The drawings constituting a part of the present application are used to provide a further understanding of the present disclosure. Schematic embodiments of the present disclosure and their descriptions are used to explain the present disclosure and do not constitute improper limitations to the present disclosure. In the drawings.

Figure 1:
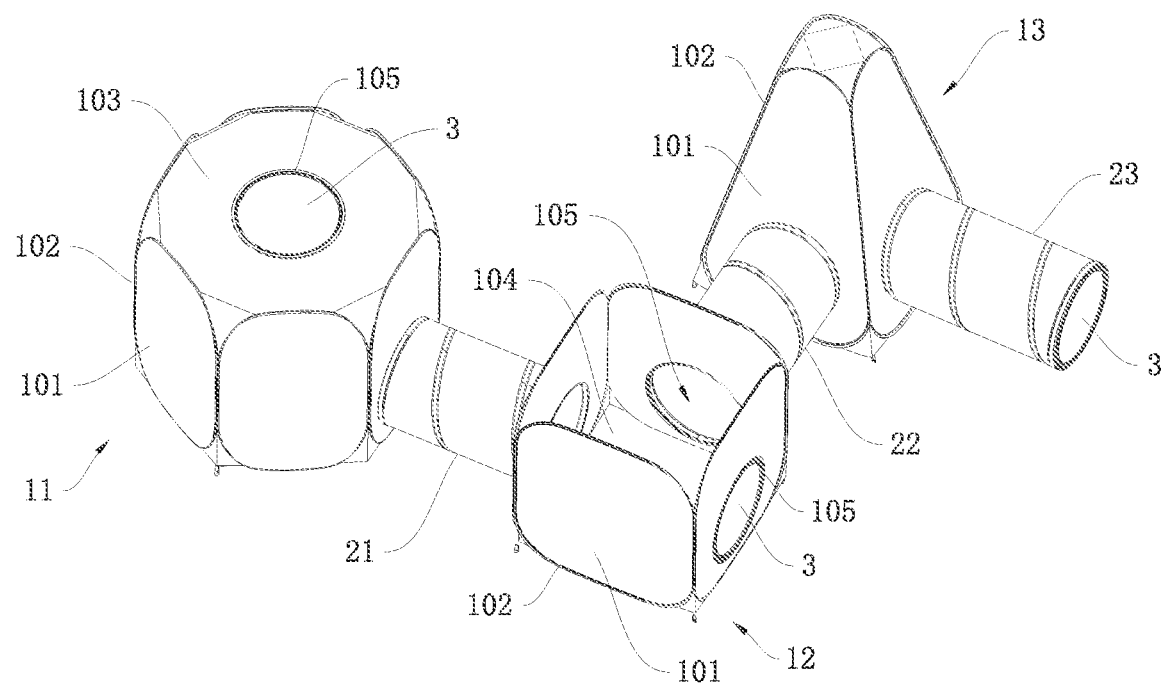
FIG. 1 is a schematic structural diagram of a combinable tent in Embodiment 1.

Description of reference signs: 11—first tent module; 12—second tent module; 13—third tent module; 14—fourth tent module; 15—fifth tent module; 101—side wall; 102—support frame; 103—top surface; 104—bottom surface; 105—opening; 2—channel module; 21—first channel module; 22—second channel module; 23—third channel module; 24—fourth channel module; 25—fifth channel module; 26—sixth channel module; 201—first zipper rack; 2011—first retaining box; 2012—first slider; 2013—first top stopper; 202—second zipper rack; 2021—second top stopper; 2022—first insert pin; 203—third zipper rack; 2031—second retaining box; 2032—second slider; 2033—second insert pin; 204—zipper teeth; 205—tape; 206—channel side wall; 207—support; 2071—spiral bracket; 2072—annular bracket; and 3—door.

DETAILED DESCRIPTION OF THE EMBODIMENTS

The present disclosure will be described in detail below with reference to the accompanying drawings and in conjunction with embodiments. The various examples are provided by way of interpretation of the present disclosure and not limiting the present disclosure. Indeed, it will be apparent to those skilled in the art that modifications and variations may be made in the present disclosure without departing from the scope or spirit of the present disclosure. For example, features shown or described as part of one embodiment may be used in another embodiment to produce yet another embodiment. It is therefore desirable that the present disclosure encompasses such modifications and variations falling within the scope of the appended claims and their equivalents.

In the description of the present disclosure, the terms "longitudinal", "transverse", "up", "down", "front", "back", "left", "right", "vertical", "horizontal", "top", "bottom" and the like denote orientation or positional relationships based on those shown in the drawings, are intended for ease of description of the present disclosure only and not to require that the present disclosure must be constructed and operated in a particular orientation, and therefore cannot be construed as a limitation to the present disclosure. The terms "connected", "connection", and "arranged" used in the present disclosure should be understood in a broad sense, for example, which may refer to a fixed connection or a detachable connection; which may refer to a direct connection or an indirect connection through an intermediate component; which may refer to a wired electrical connection, a radio connection, or a wireless communication signal connection, and the specific meanings of the above terms may be understood by those of ordinary skill in the art according to a specific situation.

One or more examples of the present disclosure are shown in the accompanying drawings. The detailed description uses numeric and letter designations to refer to features in the drawings. Similar or like reference signs in the drawings and descriptions have been used to refer to similar or like parts of the present disclosure. As used herein, the terms "first", "second", "third" and the like are used interchangeably to distinguish one member from another and are not intended to denote the location or importance of the individual member.

As shown in FIG. 1, according to an embodiment of the present disclosure, a combinable tent is provided, including a plurality of tent modules and channel modules 2 connected to the tent modules.

Each of the above tent modules is provided with at least three side walls 101, each side wall 101 being shaped by a support frame 102; and each of the above tent module has at least one bottom surface 104 or/and one top surface 103. The at least one side wall 101 of each tent module is provided with an opening 105; optionally, in some embodiments, the top surface 103 may also be provided with an opening 105; and a door 3 capable of being opened or closed can be mounted at each of the above openings 105. In addition, in some cases, an interface of each channel module 2 can be connected to the opening 105 of the side wall 101 in a matched manner, such that the above doors 3 capable of being opened or closed can be mounted at two ends of the channel module 2. The above side wall 101 and the bottom surface 104 or/and the top surface 103 can be adaptively made of a flexible or hard fabric as needed. For example, the side wall and the bottom surface or/and the top surface are all made of the flexible or hard fabric, or the side wall 101 is made of the flexible fabric, and the bottom surface 104 or/and the top surface 103 are made of the hard fabric. Certainly, if the side wall 101 is made of the hard fabric having enough hardness to support and shape the side wall 101, an edge of the side wall 101 is the above support frame 102 for shaping the side wall 101.

Each of the above channel modules 2 is provided with a channel side wall 206 shaped by a support 207. A cross-sectional shape of each channel module 2 depends on a shape formed by the support 207, for example, the cross-sectional shape includes but is not limited to a circle, an ellipse, a square, a triangle, and a polygon. The channel side wall 206 can be adaptively made of a flexible or hard fabric as needed. In this embodiment of the present application, the support 207 includes a spiral bracket 2071 in a middle and annular brackets 2072 connected to two ends of the spiral bracket 2071, and the channel side wall 206 can be made of the flexible fabric. Such a design has the advantage that the support 207 having a spiral structure and the channel side wall 206 made of the flexible fabric can cause the corresponding channel module 2 to be folded or unfolded according to an actual requirement. For example, when storage is required, the channel modules are folded to the maximum extent. When the combinable tent is formed, the channel modules are unfolded to restore to a channel state. The above door 3 capable of being opened or closed can be mounted at a port of each channel module 2, such that various combinations of spatial structures can be formed in cooperation with the tent modules.

In general, a material of the above door 3 is the same as a material of the surface where the door is located. Certainly, different materials may also be selected according to specific application situations, to meet different requirements.

In this embodiment, a zipper with a same specification is used to implement connection between the above door 3 or the corresponding channel module 2 and the above opening 105 and connection between the above door 3 and the interface of the corresponding channel module 2. The connection by the zipper has the advantages of good continuity of a joint, high strength of connection, and simple operation.

In Embodiment 1 corresponding to FIG. 1, the combinable tent according to the present application includes three tent modules and three channel modules 2, where a first tent module 11 communicates with a second tent module 12 by a first channel module 21, a second tent module 12 communicates with a third tent module 13 by a second channel module 22, and finally, a third channel module 23 is separately connected to the third tent module 13. In this embodiment, the tent modules are formed with different spatial structures to accommodate items adapted to spaces thereof. For example, the third tent module 13 has a high longitudinal space for accommodating a tower-shaped toy. Children or pet owners can creatively build and obtain different spatial structures through combination according to their preferences.

To further obtain more spatial structures through combination, the channel modules 2 in the present application can be interconnected. Infinite extension of the channels can be implemented with sufficient channel modules 2 under ideal conditions. Certainly, the present application aims to optionally extend the length of the channels, thereby allowing for the formation of more different combinations of spatial structures.

Figure 2:
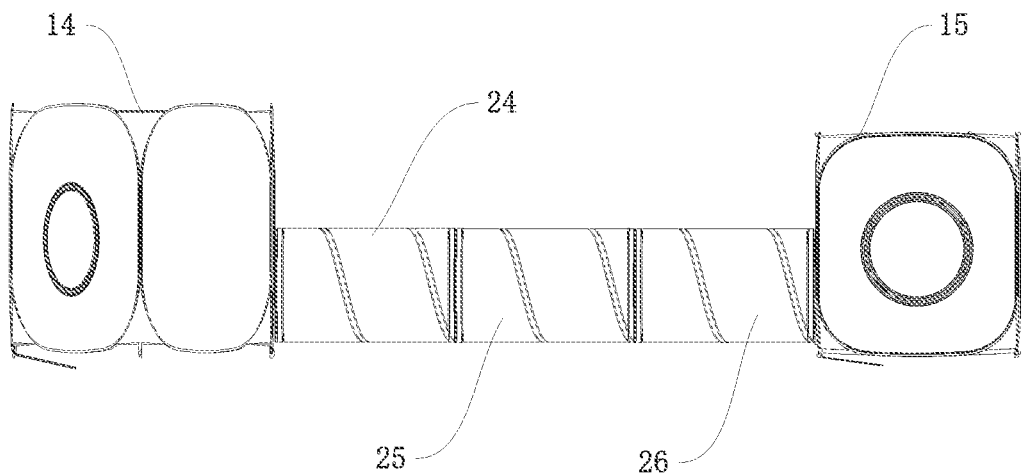
FIG. 2 is a schematic structural diagram of a combinable tent in Embodiment 2.

In Embodiment 2 corresponding to FIG. 2, the combinable tent according to the present application includes two tent modules and three channel modules 2. A fourth channel module 24, a fifth channel module 25, and a sixth channel module 26 are sequentially connected and form a channel corridor with a left port connected to a fourth tent module 14 and a right port connected to a fifth tent module 15.

Specifically, in some embodiments, interfaces at two ends of each channel module 2 are two annular zipper racks independent of each other, where each of a first zipper rack 201 and a second zipper rack 202 has a first end and a second end in a same direction; a first slider 2012 is arranged on the first zipper rack 201, and a first retaining box 2011 is arranged at the first end of the first zipper rack; and a first insert pin 2022 is arranged at the second end of the second zipper rack 202.

Optionally, a first top stopper 2013 is arranged at the second end of the first zipper rack 201, or/and a second top stopper 2021 is arranged at the first end of the second zipper rack 202.

Figure 3:
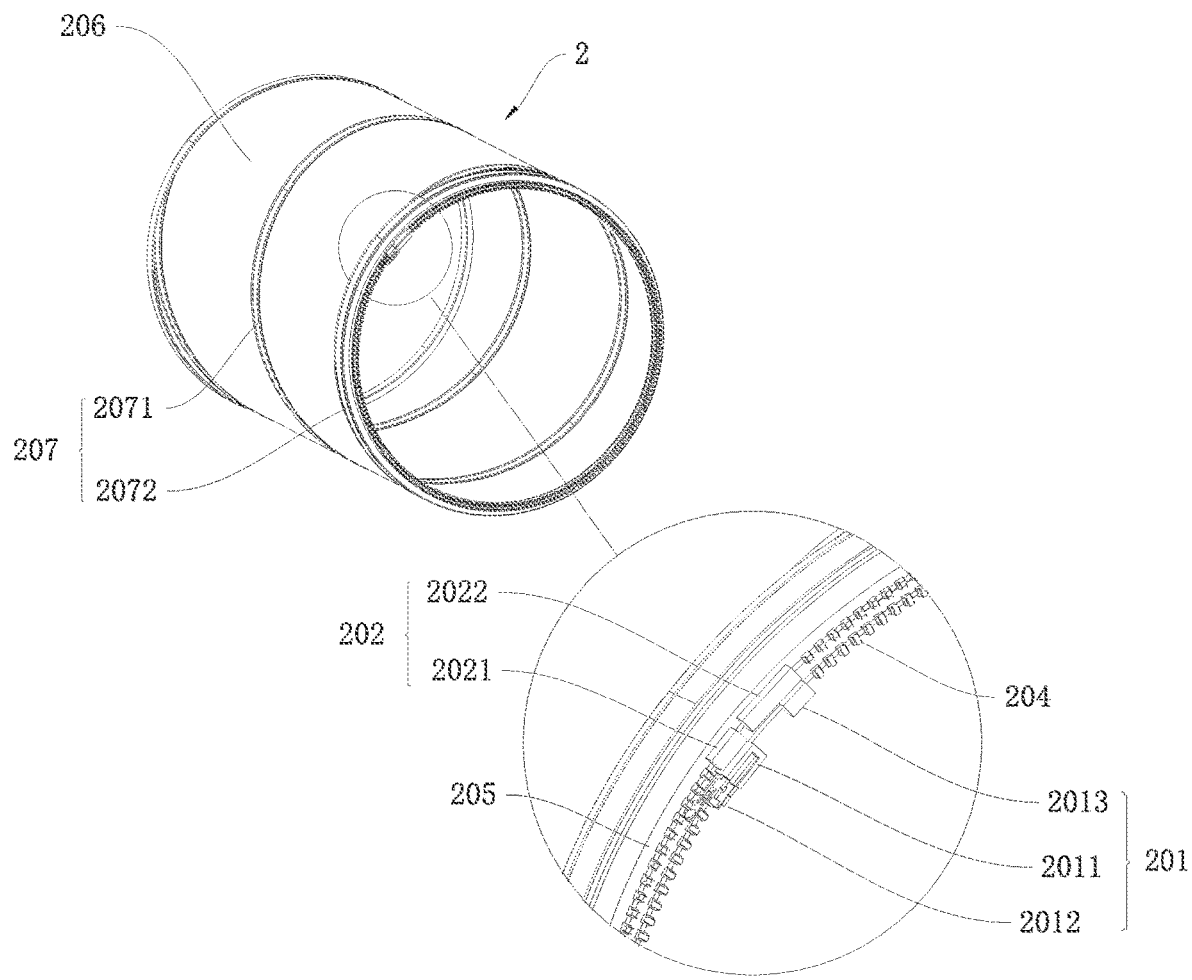
FIG. 3 is a schematic structural diagram of a first implementation of a zipper assembly in Embodiment 3.

In Embodiment 3, a port of each channel module 2 is used as an example. As shown in FIG. 3, in this embodiment, zipper teeth 204 of two zipper racks are connected to the annular port of the channel module 2 by corresponding tapes 205, and are arranged along a circumferential direction of the annular port to form two annular zipper racks independent of each other. The two zipper racks are a first zipper rack and a second zipper rack 202 along a radial direction of each channel module 2 from inside to outside. Each of the first zipper rack 201 and the second zipper rack 202 has a first end and a second end in a same direction; a first retaining box 2011 and a first slider 2012 are arranged at the first end of the first zipper rack 201, and a first top stopper 2013 is arranged at the second end of the first zipper rack; and a second top stopper 2021 is arranged at the first end of the second zipper rack 202, and a first insert pin 2022 is arranged at the second end of the second zipper rack. The fourth channel module 24 and the fifth channel module 25 in Embodiment 2 are used as an example. The first zipper rack 201 on the right port of the fourth channel module 24 and the second zipper rack 202 on the left port of the fifth channel module 25 cooperate to form a complete zipper, and two sides of the zipper are connected, to implement connection between the fourth channel module 24 and the fifth channel module 25. Similarly, the three channel modules 2 in Embodiment 2 are sequentially connected by the above connection method and form a channel corridor. In this embodiment, each of the openings 105 on the tent modules is provided with the first zipper rack 201 or/and the second zipper rack 202 matched with the interface of the corresponding channel module 2, to implement connection between the channel modules 2 and the tent modules.

In some embodiments, in Embodiment 3, there is no requirement for a positional relationship between the first zipper rack 201 and the second zipper rack 202 in the radial direction of each channel module 2.

Preferably, the first zipper rack 201 and the second zipper rack 202 in Embodiment 3 are adjacently arranged.

In some other embodiments, interfaces at two ends of each channel module 2 are at least one third zipper rack 203, where a second slider 2032 is arranged on any one third zipper rack 203, a second retaining box 2031 is arranged at a first end of the third zipper rack, and a second insert pin 2033 is arranged at a second end of the third zipper rack.

Figure 4:
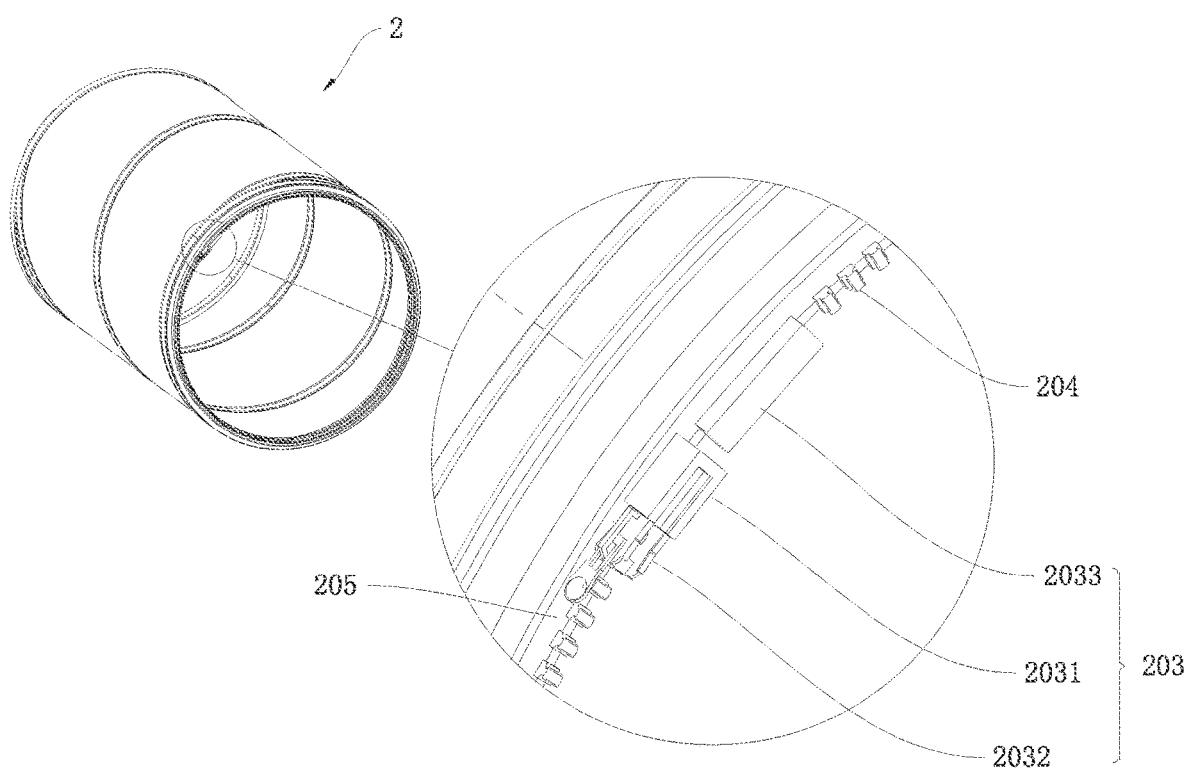
FIG. 4 is a schematic structural diagram of a second implementation of a zipper assembly in Embodiment 5.

In Embodiment 4, a port of each channel module 2 is used as an example. As shown in FIG. 4, in this embodiment, zipper teeth 204 of the third zipper rack 203 are connected to the port of the channel module 2 by a tape 205, and are arranged along a circumferential direction of the port to form an annular zipper rack. A second retaining box 2031 and a second slider 2032 are arranged at a first end of the third zipper rack 203, and a second insert pin 2033 is arranged at a second end of the third zipper rack. The fourth channel module 24 and the fifth channel module 25 in Embodiment 2 are still used as an example. The third zipper rack 203 on the right port of the fourth channel module 24 and the third zipper rack 203 on the left port of the fifth channel module 25 cooperate to form a complete zipper, and two sides of the zipper are connected, to implement connection between the fourth channel module 24 and the fifth channel module 25. Similarly, the three channel modules 2 in Embodiment 2 are sequentially connected by the above connection method and form a channel corridor. In this embodiment, each of the openings 105 on the tent modules is provided with the zipper rack matched with the third zipper rack 203, to implement connection between the channel modules 2 and the tent modules.

Each channel module 2 in the above embodiment has all ports at a same angle of view, and the same zipper racks at the ports have a same direction. For example, in Embodiment 3, when either end of each channel module 2 is in a front view, the first ends and the second ends of the first zipper rack 201 and the second zipper rack 202 are arranged counterclockwise on the corresponding zipper racks.

Certainly, the opening 105 in each of the above tent modules may be provided with two connection interfaces, where a first interface is configured to be connected to the door 3, and a second interface is configured to be connected to the corresponding channel module 2. The two interfaces may be same connecting pieces, for example, the connecting pieces of the two connection interfaces are zippers; or the two interfaces may be different connecting pieces, for example, the connecting piece of the first interface is a hook and loop fastener, and the connecting piece of the second interface is a zipper.

The above is merely a preferred embodiment of the present disclosure and is not intended to limit the present disclosure which may be subject to various modifications and variations for those skilled in the art. Any modification, equivalent replacement, improvement, etc. made within the spirit and principle of the present disclosure should be included in the scope of protection of the present disclosure.

What is claimed is:

1. A combinable tent, comprising
a plurality of tent modules and
at least one channel module connected to the tent modules,
wherein each of the tent modules has a spatial structure formed by a plurality of surfaces enclosed together, and at least one opening configured to be connected the at least one channel module is arranged in one of the surfaces; and
the at least one channel module comprises a channel and zipper assemblies arranged at two ends of the channel,
wherein each of the zipper assemblies comprises a first zipper rack and a second zipper rack independent of each other, both the first zipper rack and the second zipper rack being arranged along a circumferential direction of a port of a corresponding one of the channel modules where the zipper assembly is located,
a first slider is arranged on the first zipper rack; a first retaining box is arranged at an end of the first zipper rack and a first top stopper is arranged at an other end of the first zipper rack; an insert pin is arranged at an end of the second zipper rack; and a second top stopper is arranged at an other end of the second zipper rack; an end of the first retaining box is aligned with an end of the second top stopper, an end of the insert pin is aligned with an end of the first top stopper;
the opening of each of the tent modules is provided with a first zipper rack or/and a second zipper rack matched with the zipper assembly;
the first zipper rack of the at least one channel module is configured to connect the second zipper rack of an adjacent tent module or an adjacent channel module; the second zipper rack of the at least one channel module is configured to connect the first zipper rack of the adjacent tent module or the adjacent channel module.

2. The combinable tent according to claim 1,
wherein the multiple surfaces of each of the tent modules comprise
at least three side walls and
at least one bottom surface and/or at least one top surface,
wherein the side walls are all shaped by support frames.

3. The combinable tent according to claim 1,
wherein the channel comprises a channel side wall and a support for shaping the channel side wall.

4. The combinable tent according to claim 3,
wherein the channel side wall is made of a flexible or hard fabric.

5. The combinable tent according to claim 3,
wherein the support comprises a spiral bracket and annular brackets connected to two ends of the spiral bracket.

6. The combinable tent according to claim 1,
wherein the surfaces of each of the tent modules are made of a flexible or hard fabric.

7. The combinable tent according to claim 1,
wherein a door capable of being opened or closed is mounted at the opening in each of the tent modules and/or a port of the channel.

8. The combinable tent according to claim 1,
wherein the first zipper rack and the second zipper rack are adjacently arranged.

9. The combinable tent according to claim 1,
wherein the opening in each of the tent modules is provided with two connection interfaces, wherein a first interface is configured to be connected to a door, and a second interface is configured to be connected to a corresponding one of the channel modules.

10. The combinable tent according to claim 9, wherein the first interface is arranged on an inner side of the second interface.

\* \* \* \* \*